United States Patent
Choi et al.

(10) Patent No.: US 11,083,195 B2
(45) Date of Patent: Aug. 10, 2021

(54) INSECTICIDAL COMPOSITIONS AND METHODS TO KILL INSECTS

(71) Applicant: The United States of America, as represented by the Secretary of Agriculture, Washington, DC (US)

(72) Inventors: Man Y Choi, Albany, OR (US); Jana C. Lee, Corvallis, OR (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 16/903,511

(22) Filed: Jun. 17, 2020

(65) Prior Publication Data
US 2020/0396996 A1 Dec. 24, 2020

Related U.S. Application Data

(60) Provisional application No. 62/863,302, filed on Jun. 19, 2019.

(51) Int. Cl.
*A01N 43/16* (2006.01)
*A01N 31/02* (2006.01)

(52) U.S. Cl.
CPC ............. *A01N 43/16* (2013.01); *A01N 31/02* (2013.01)

(58) Field of Classification Search
None
See application file for complete search history.

(56) References Cited

U.S. PATENT DOCUMENTS

| | | | |
|---|---|---|---|
| 6,753,009 B2* | 6/2004 | Luber | A61K 9/0056 424/441 |
| 2002/0187232 A1* | 12/2002 | Lee | A23L 2/60 426/548 |
| 2004/0076690 A1* | 4/2004 | Ikemoto | A61K 31/075 424/729 |
| 2017/0013832 A1 | 1/2017 | Marenda et al. | |

FOREIGN PATENT DOCUMENTS

CN 104770365 A 7/2015

OTHER PUBLICATIONS

Burkhard Bilger, 2006, "The History of Splenda the Best-selling Artificial Sweetener in America", The New Yorker, May 2006, pp. 1-7.
Gilkey, P. L. et al., "Lethal effects of erythritol on the mosquito *Aedes aegypt* i Linnaeus (Diptera: Culicidae)", Journal of Applied Entomology, 2018, vol. 142, pp. 873-881.
Fisher, M. L. et al., "Survival of the House Fly (Diptera: Muscidae) on Truvia and Other Sweeteners", Journal of Medical Entomology, 2017, vol. 54, No. 4, pp. 999-1005.
Baudier , K. M. et al ., Erythritol, a Non-Nutritive Sugar Alcohol Sweetener and the Main Component of TruviaH, Is a Palatable Ingested Insecticide PLOS ONE, Jun. 4, 2014, vol. 9, Issue 6, Article No. e98949, pp. 1-7.
PCT International Search Report dated Oct. 7, 2020.

\* cited by examiner

*Primary Examiner* — Dale R Miller
(74) *Attorney, Agent, or Firm* — John D. Fado; G. Byron Stover

(57) ABSTRACT

Insecticidal compositions containing an insecticidal effective amount of erythritol and sucralose, and optionally a carrier. Insecticidal bait composition containing (a) an effective amount of the insecticidal composition, (b) one or more food materials, and (c) optionally a phagostimulant. Method for killing insects involving treating an object or area with a composition containing an insects killing effective amount of the insecticidal composition.

5 Claims, 4 Drawing Sheets
(4 of 4 Drawing Sheet(s) Filed in Color)

INSECTICIDAL COMPOSITIONS AND METHODS TO KILL INSECTS

REFERENCE TO RELATED APPLICATION

This application claims the benefit of U.S. Provisional Application No. 62/863,302, filed 19 Jun. 2019, which is incorporated herein by reference in its entirety.

BACKGROUND OF THE INVENTION

Disclosed herein are insecticidal compositions, wherein said compositions contains an insecticidal effective amount of erythritol and sucralose, and optionally a carrier. Also disclosed are insecticidal bait compositions containing (a) an effective amount of the insecticidal compositions, (b) one or more food materials, and (c) optionally a phagostimulant. In addition there is disclosed methods for killing insects involving treating an object or area with compositions containing an insects killing effective amount of the insecticidal compositions.

A variety of non-nutritive sweeteners, including erythritol and sucralose, have been approved for use as food additives and sugar alternatives with zero-calories in the United States (FDA, High-Intensity Sweeteners, 2014). The sweeteners are non-metabolizable carbohydrates that cannot be digested or converted to a nutrient source in the human body, so they are non-nutritive sugars. Erythritol (MW 122) is a four carbon-structured sugar alcohol with 70% of the sweetness of sucrose (MW 342). Sucralose (MW 397) is a disaccharide sugar known to be about hundred times sweeter than sucrose.

Erythritol has been tested as an ingested insecticide for *Drosophila melanogaster*, and it has been shown that the sweetener could be used as a potential insecticide (Baudier, K. M., et al., PLoS ONE, 9(6): e98949 (2014); O'Donnell, S., et al., Journal of Insect Science, 16:1-3 (2016)). Recently, erythritol was also shown to have insecticidal properties against spotted wing drosophila (SWD), *Drosophila suzukii* (Choi, M. Y., et al., Journal of Insect Physiology, 99:86-94 (2017); Choi, M. Y., et al., Journal of Economic Entomology, 112: 981-985 (2019); Sampson, B. J., et al., Journal of Applied Entomology, 141: 8-18 (2017); Sampson, B. J., et al., Journal of Economic Entomology 110: 530-534 (2017); Sampson, B. J., et al., Journal of Econ Entomology, 112: 173-180 (2019); Tang, S. B., et al., Journal of Insect Physiology, 101:178-184 (2017)), the oriental fruit fly, *Bactrocera dorsalis* (Zheng, C., et al., Pest Management Science, 72:990-996 (2016)), and the house fly, *Musca domestica* (Fisher, M. L., et al., Journal of Medical Entomology, 54:999-1005 (2017)). Studies by Choi, M. Y., and Lee, J. C., et al., Journal of Insect Physiology, 99:86-94 (2017), Journal of Insect Physiology, 101:178-184 (2017), and Journal of Economic Entomology, 112: 981-985 (2019), demonstrated that unused erythritol molecules accumulate in the fly body, causing the fly to have high osmotic pressure in the hemolymph. Two insecticidal mechanisms were demonstrated: (1) starvation from non-metabolizable erythritol and (2) hyper-physiological change from abnormally high osmotic pressure.

Although erythritol alone can induce mortality, *D. suzukii* prefers to feed on other sugar sources over erythritol when given a choice. *D. melanogaster* flies select sugars based on nutritional value and flies can recognize a nutritional sugar through learning and appetitive memory (Burke, C. J., et al., Current Biology, 21:746-750 (2011); Fujita, M., et al., Current Biology, 21: 751-755 (2011)). For this reason, sucrose was added to erythritol as a phagostimulant, causing *D. suzukii* to ingest more erythritol. In previous studies, while keeping sucrose at 0.5 or 1.0 M, higher concentrations of erythritol at 2.0 M elicited quicker mortality than lower doses at 0.5 or 1.0 M. Two erythritol/sucrose ratios, erythritol 2.0 M/sucrose 0.5 M, and erythritol 2.0 M/sucrose 1.0 M showed the highest mortality and lowest fecundity in *D. suzukii* bioassays. Two formulations were further evaluated in cages with blueberry bushes and fruits in a greenhouse. Interestingly, the erythritol 2.0 M/sucrose 0.5 M was more detrimental than the erythritol 2.0 M/sucrose 1.0 M on *D. suzukii* in the cage experiment but not in the lab experiment. Notably, the erythritol 2.0 M/sucrose 1.0 M contains a high concentration of sugars (w/v, approx. 58.6%) and is a very sticky solution and is almost saturated at room temperature. We selected the erythritol 2.0 M/sucrose 0.5 M formulation to evaluate for more *D. suzukii* bioassays. We also evaluated honeybee survivorship and found no discernible impact on adult survivorship (Choi, M. Y., et al., Journal of Economic Entomology, 112: 981-985 (2019)).

The erythritol/sucrose formulation (Ery 2.0 M/Suc 0.5 M, w/v=41.5% total sugar concentration) was sprayed on blueberry plants in the greenhouse and field. The aerosol spray made a sticky surface on fruits and leaves, and may be costly to use in the field. Another disadvantage of use of the erythritol/sucrose formulation is that the sucrose contained as a phagostimulant in the formulation is providing the nutritional carbohydrate. The sucrose can be metabolized and utilized by the fly when the fly finds water in the field. As a result, sucrose decreases the insecticidal effect of the formulation on the fly survivorship.

We successively tested various formulations of erythritol mixed with low doses of sucralose, and a phagostimulant (e.g., sucralose).

SUMMARY OF THE INVENTION

Disclosed herein are insecticidal compositions containing an insecticidal effective amount of erythritol and sucralose, and optionally a carrier. Also disclosed are insecticidal bait compositions containing (a) an effective amount of the insecticidal compositions, (b) one or more food materials, and (c) optionally a phagostimulant. In addition there are disclosed methods for killing insects involving treating an object or area with compositions containing an insects killing effective amount of the insecticidal compositions.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary

Exemplary

Exemplary

Exemplary

Exemplary

Exemplary

Exemplary

DETAILED DESCRIPTION OF THE INVENTION

Figure 1:
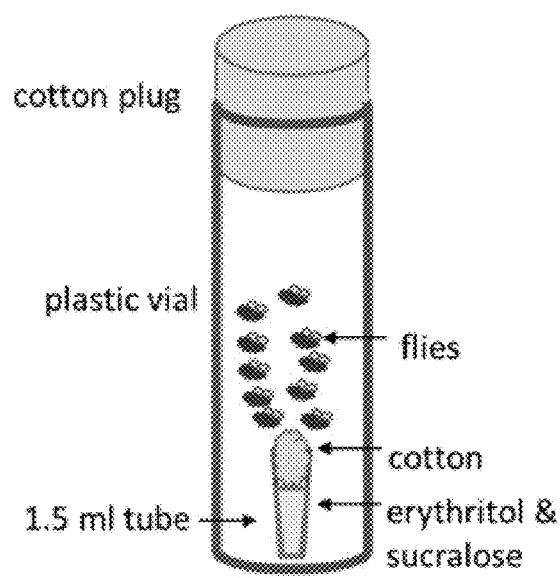
FIG. 1 shows survivorship arena of *D. suzukii* in the plastic vial (28 mm id×95 mm height) with combinations of erythritol/sucrose or sucralose solutions as described below.

Disclosed herein are insecticidal compositions containing an insecticidal effective amount of erythritol and sucralose, and optionally a carrier. Also disclosed are insecticidal bait compositions containing (a) an effective amount of the insecticidal compositions, (b) one or more food materials, and (c) optionally a phagostimulant.

In addition there are disclosed methods for killing insects involving treating an object or area with an insect killing effective amount of the compositions containing the compounds disclosed herein and optionally a carrier (e.g., agronomically or physiologically or pharmaceutically acceptable carrier). The carrier component can be a liquid or a solid material. The term "carrier" as used herein includes carrier materials such as those described below. As is known in the art, the vehicle or carrier to be used refers to a substrate such as a mineral oil, paraffin, silicon oil, water, membrane, sachets, disks, rope, vials, tubes, septa, resin, hollow fiber, microcapsule, cigarette filter, gel, fiber, natural and/or synthetic polymers, elastomers or the like. All of these substrates have been used to controlled release effective amount of a composition containing the compounds disclosed herein in general and are well known in the art. Suitable carriers are well-known in the art and are selected in accordance with the ultimate application of interest. Agronomically acceptable substances include aqueous solutions, glycols, alcohols, ketones, esters, hydrocarbons halogenated hydrocarbons, polyvinyl chloride; in addition, solid carriers such as clays, laminates, cellulosic and rubber matrices and synthetic polymer matrices, or the like. The carrier does not include the body of an insect (e.g., SWD).

The terms "object" or "area" as used herein include any place where the presence of target pests is not desirable, including any type of premises, which can be out-of-doors, such as in farms, orchards, parks, yards, gardens, lawns, tents, camping bed nets, camping areas, forests, and so forth, or indoors, such as in barns, garages, commercial buildings, homes, silos, grain storage, and so forth, or any area where pests are a problem, such as in shipping or storage containers (e.g., luggage, bags, boxes, crates, etc.), packing materials, bedding, and so forth; also includes clothing.

The amount of the compounds described herein or compositions described herein to be used will be at least an effective amount. The term "effective amount," as used herein, means the minimum amount of the compounds or compositions needed to kill the insects, ticks, mites, spiders, centipedes, scorpions, chiggers, and solifugids when compared to the same area or object which is untreated. Of course, the precise amount needed will vary in accordance with the particular composition used; the type of area or object to be treated; and the environment in which the area or object is located. The precise amount of the composition can easily be determined by one skilled in the art given the teaching of this application. For example, one skilled in the art could follow the procedures utilized below; the composition would be statistically significant in comparison to a negative control. The compounds described herein or compositions described herein to be used will be at least an effective amount of the compound or diluted solution of the compound. Generally the concentration of the compounds will be, but not limited to, insecticidal effective ratios of erythritol and sucralose (e.g., ratio of about 200 to about 20 (200-20), preferably about 100 to about 10 (100 to 10), more preferably about 10 to about 1 (10 to 1), most preferably about 1 to about 0.1 (1 to 0.1) erythritol to sucralose). The composition may or may not contain a control agent for insects, such as a biological control agent or an insecticide known in the art to kill insects. Other compounds (e.g., insect attractants or other insecticides known in the art) may be added to the composition provided they do not substantially interfere with the intended activity and efficacy of the composition; whether or not a compound interferes with activity and/or efficacy can be determined, for example, by the procedures utilized below.

The compositions can therefore be used for killing insects such as agriculturally important insects, harmful or troublesome blood-sucking, stinging and biting insects, ticks and mites. The term "insects" as used herein include all stages of insect life cycle: adults, larvae, nymphs, pupae, and eggs. The term "insects" as used herein includes non-insects such as ticks, mites, spiders, centipedes, scorpions, chiggers, and solifugids.

Agriculturally important insects (e.g., insects that are harmful to agricultural products such as ripening fruits such as blueberry, cherry, raspberry, etc.) include insects in the Order Diptera, including insects in the Drosophilidae family (e.g., *Drosophila melanogaster*, spotted wing drosophila *Drosophila suzukii*) and the Tephritidae family (e.g., *Bactrocera oleae* and the *Vidalia* genus).

Agriculturally important insects (e.g., insects in the Order Diptera) also include brown marmorated stinkbug *Halyomorpha halys*, emerald ash borer *Agrilus planipennis*, gypsy moth *Lymantria dispar* dispar, pink hibiscus mealybug *Maconellicoccus hirsutus*, Mediterranean fruit fly *Ceratitis capitata*, plum curculio *Conotrachelus nenuphar*, diamondback moth *Plutella xylostella*, soybean aphid *Aphis glycines*, cotton aphid *Aphis gossypii*, sugarcane aphid, *Melanaphis sacchari*, indianmeal moths *Plodia interpunctella*, bean weevils *Acanthoscelides obtectus*, mountain pine beetle *Dendroctonus ponderosas*, colorado potato beetle *Leptinotarsa decemlineata*, Asian citrus psyllid *Diaphorina citri* Kuwayama, light brown apple moth *Epiphyas postvittanaor*, earworm *Helicoverpa armigera*, potato white worm *Helicoverpa armigera*, western corn rootworm, *Diabrotica virgifera* virgifera, lygus species (e.g., *Lygus lineolaris, Lygus hesperus, Lygus rugulipennis*), spotted lanternfly, *Lycorma delicatula*, khapra beetle *Trogoderma granarium*, Indian meal moth, *Plodia interpunctella*, clothes moths, *Tinea* and *Tineola* species, cigarette beetle, *Lasioderma serricorne*, drugstore beetle, *Stegobium paniceum*, saw-toothed grain beetle, *Oryzaephilus surinamensis*, larder beetles *Dermestes lardarius*, mealworm beetle *Tenebrio molitor*, flour beetles (e.g. darkling beetle genera *Tribolium* or *Tenebrio*), carpet beetles (e.g. *Anthrenus verbasci*), bee louse *Braula coeca*, small hive beetle *Aethina tumida*, larval greater wax moth *Galleria mellonella*, and tobacco hornworm *Manduca sexta*.

Blood-sucking insects (e.g, insects in the Order Diptera) include mosquitoes (for example *Aedes, Culex* and *Anopheles* species), sand flies (for example *Phlebotomus* and *Lutzomyia* species such as *Phlebotomus papatasi*), owl gnats (*Phlebotoma*), blackfly (*Culicoides* species), buffalo gnats (*Simulium* species), biting flies (for example *Stomoxys calcitrans*), tsetse flies (*Glossina* species), horseflies (*Tabanus, Haematopota* and *Chrysops* species), house flies (for example *Musca domestica* and *Fannia canicularis*), meat flies (for example *Sarcophaga carnaria*), flies which cause myiasis (for example *Lucilia cuprina, Chrysomyia chloropyga, Hypoderma bovis, Hypoderma lineatum, Dermatobia hominis, Oestrus ovis, Gasterophilus intestinalis* and *Cochliomyia hominovorax*), bugs (for example *Cimex lectularius, Rhodnius prolixus* and *Triatoma infestans*), lice (for example *Pediculus humanus, Haematopinus suis* and *Damalina ovis*), louse flies (for example *Melaphagus orinus*), fleas (for example *Pulex irritans, Cthenocephalides canis* and *Xenopsylla cheopis*) and sand fleas (for example *Dermatophilus penetrans*).

Biting insects include cockroaches (for example *Blattella germanica, Periplanetaamericana, Blatta orientalis* and *Supella supellectilium*), beetles (for example *Sitophilus granarius, Tenebrio molitor, Dermestes lardarius, Stegobium paniceum, Anobium punctactum* and *Hylotrupes bajulus*), termites (for example *Reticulitermes lucifugus*), bed bug (for example *Cimex lectularius*) and ants (for example *Lasius niger*).

Ticks include, for example, *Ornithodorus moubata, Ixodes ricinus, Boophilus microplus* and *Amblyomma hebreum*, and mites include, for example, *Varroa destructor, Sarcoptes scabiei, Dermanyssus gallinae, Tetranychus urticae, Tetranychus cinnabarinus*, and *Oligonychus pratensis*.

Spiders include, for example, *Lactrodectus mactans, Loxosceles recluse, Tegenaria agrestis (Walckenaer), Achaearanea tepidariorum, Salticidae, Pholcus phalangioides*, and *Lycosa*.

Centipedes include, for example, *Scutigera coleoptrata*.

Scorpions include, for example, *Centruroides exilicauda, Centruroides vittatus, Hadrurus arizonensis*, and *Solifugae*.

Solifugids include, for example, *Solifugae*.

Preferably, the blood-sucking and biting insects, ticks and mites include mosquitoes and the agriculturally important insects include fruit flies such as spotted wing drosophila *Drosophila suzukii*.

"Optional" or "optionally" means that the subsequently described event or circumstance may or may not occur, and that the description includes instances in which said event or circumstance occurs and instances where it does not. For example, the phrase "optionally comprising a known insect attractant" means that the composition may or may not contain a known insect attractant and that this description includes compositions that contain and do not contain a known insect attractant. Also, by example, the phrase "optionally adding a known insect attractant" means that the method may or may not involve adding a known insect attractant and that this description includes methods that involve and do not involve adding a known insect attractant.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

Examples

Materials and Methods. Flies and sugars: *Drosophila suzukii* used in these experiments were from a colony maintained at 22±5° C. under a photoperiod of L:D 16:8 h, and a relative humidity of 60±5% RH at the Horticultural Crops Research Unit, USDA ARS in Corvallis, Oreg. Wild-type flies collected from infested fruits in Corvallis, Oreg. were used to start the colony. Standard rearing methods and diet are described by Woltz, J. M., et al., Journal of Applied Entomology, 139:759-770 (2015). Newly emerged adult males and females were collected daily and maintained in cages with water and diet until they were specific ages for experimentation. Sugars used in this study, meso-erythritol (>99%), sucrose (>99%), and sucralose (>99%), were purchased from Fisher Scientific (Hampton, N.H.).

Different sugar formulations on the fly survivorship: Ten 5-day old flies (5 males and 5 females) were introduced into a plastic vial and given a tube (1.5 ml) containing different water-based solutions. Two combinations of erythritol (Ery) mixed with sucrose (Suc) or sucralose (Sul) were introduced to flies in a plastic vial for 7 days (FIG. 1). For the first experiment various pairs were tested (Table 1): Suc 0.5 M, Ery 0.5 M, Ery 1.5 M+Suc 0.5 M, and Ery 1.5 M+Suc 0.1 M. For the second experiment various pairs were tested (Table 2): Suc 0.5 M, Ery 0.5 M, Sul 0.5 M, Sul 0.1 M, Ery 1.5 M+Sul 0.5 M, Ery 1.5 M+Sul 0.1 M, Ery 2.0 M+Sul 0.1 M, and Ery 2.0 M+Sul 0.01 M. Survivorship of flies was checked daily for 7 days. Each pair per experiment was replicated at least three times.

Results. Comparison of erythritol formulations with sugars on fly mortality: Surprisingly fly survivorship was significantly decreased in 7 days (Table 1 and FIG. 2). Surprisingly, the fastest and highest mortality occurred with erythritol 1.5 M/sucralose 0.1 M, followed by 0.5 M erythritol only (=a negative control), and erythritol 1.5 M/sucrose 0.5 M.

Figure 3:
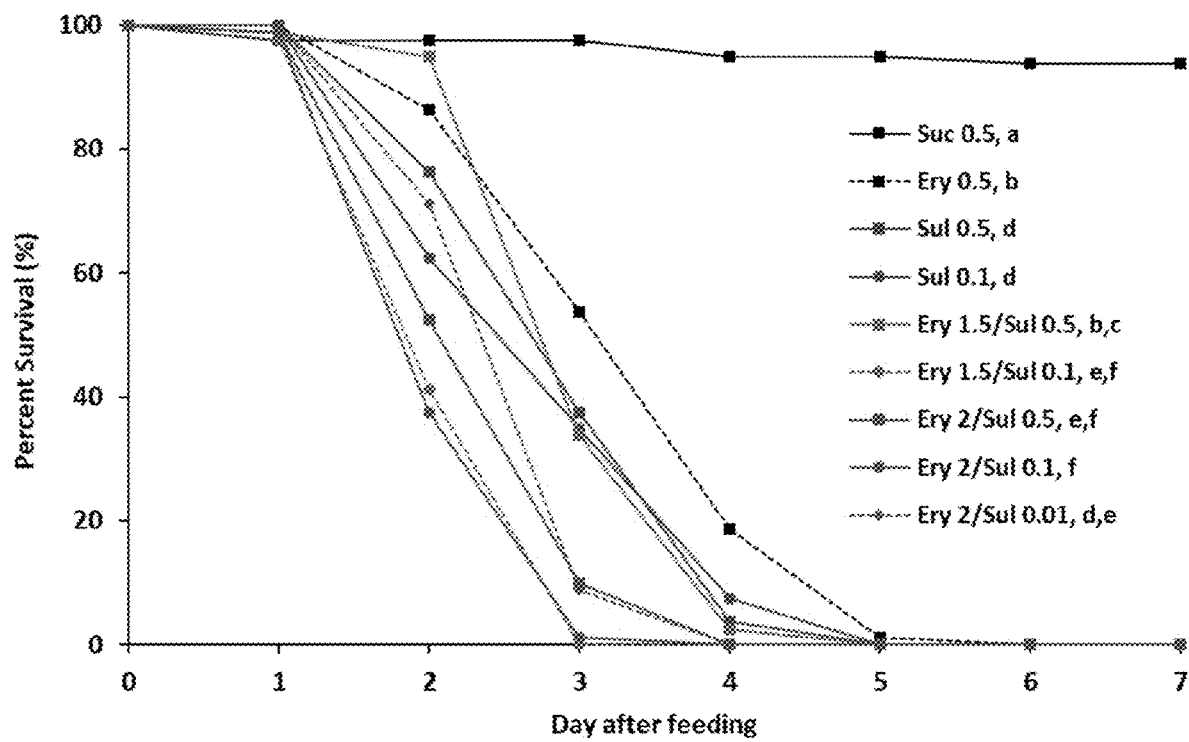
FIG. 3 shows survivorship of *D. suzukii* adults with various combinations of erythritol/sucralose during 7 days as described below. Each combination was replicated eight times. Different letters denote significant differences by log-rank pairwise comparisons.

Effect of various erythritol formulations with sucralose on fly mortality: Various combinations of erythritol/sucralose dose were introduced to flies in the plastic vial for 7 days (FIG. 3). The fastest and highest mortality surprisingly occurred with erythritol 2.0 M/sucralose 0.1 M, erythritol 1.5 M/sucralose 0.5 M, and erythritol 1.5 M/sucralose 0.1 M, followed by erythritol 2.0 M/sucralose 0.01 M, sucralose 0.5 M, and sucralose 0.1 M. The mortalities from the erythritol 0.5 M only (=a negative control), and the erythritol 1.5 M/sucralose 0.5 M were statistically the same values. Overall results showed the erythritol combined with a low dose of the sucralose surprisingly increased the fly mortality, but higher sucralose concentration does not enhance the mortality. For example, the sucralose 0.5 M and the sucralose 0.1 showed statistically the same effect (FIG. 3). Without being bound by theory, excessive sweetness might interfere with fly feeding activity.

Figure 4:
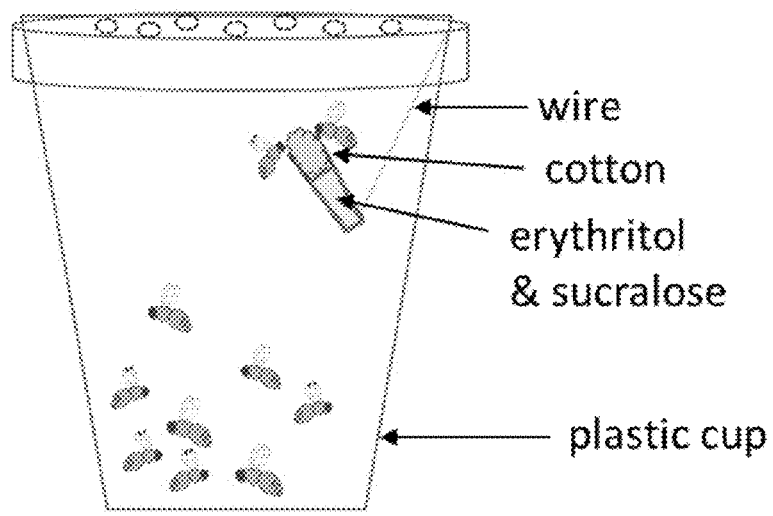
FIG. 4 shows survivorship arena of *D. suzukii* in a plastic deli cup (0.5 L) with combinations of erythritol/sucrose or sucralose solutions as described below.
Figure 5:
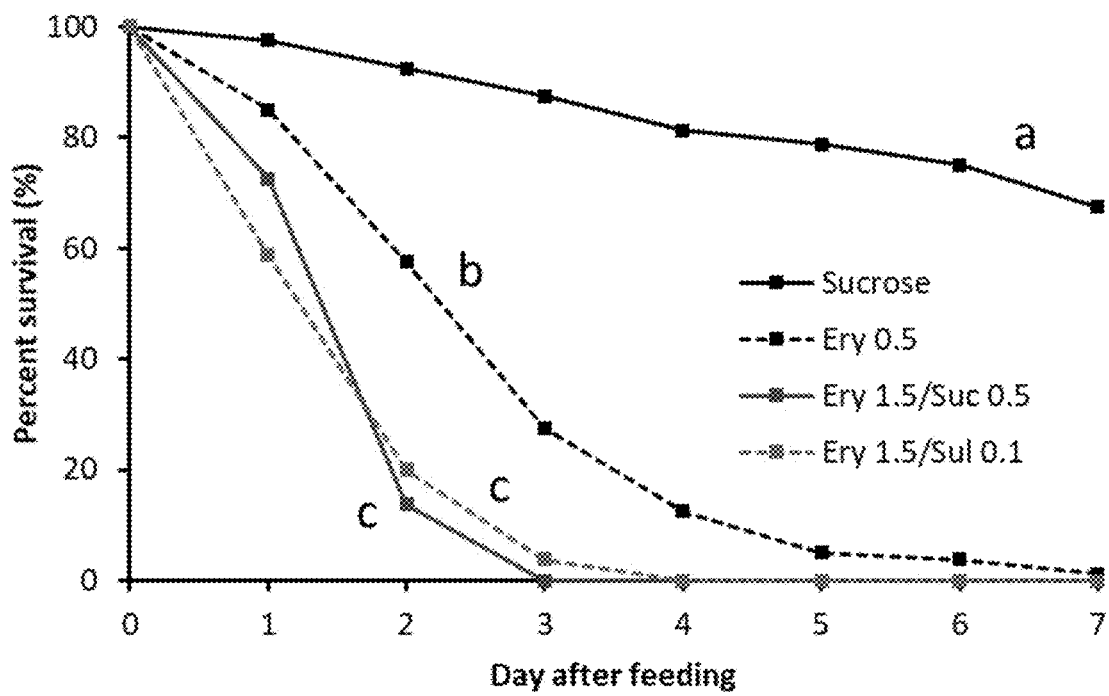
FIG. 5 shows survivorship of *D. suzukii* adults with combinations of erythritol/sucrose or sucralose solutions as described below. Each combination was replicated eight times.

Effect of erythritol formulations with sucrose or sucralose on fly mortality in the cup experiment: Two combinations of erythritol (Ery) mixed with sucrose (Suc) or sucralose (Sul) were introduced to ten flies in a 0.5 L deli cup for 7 days. Cotton wicks are suspended from green floral wire (FIG. 4). Surprisingly, the fastest and highest mortality occurred with erythritol 1.5 M/sucralose 0.1 M (Ery 1.5/Sul 0.1) and erythritol 1.5 M/sucrose 0.5 M (Ery 1.5/Suc 0.5), followed by 0.5 M erythritol only (=a negative control) (FIG. 5).

Figure 2:
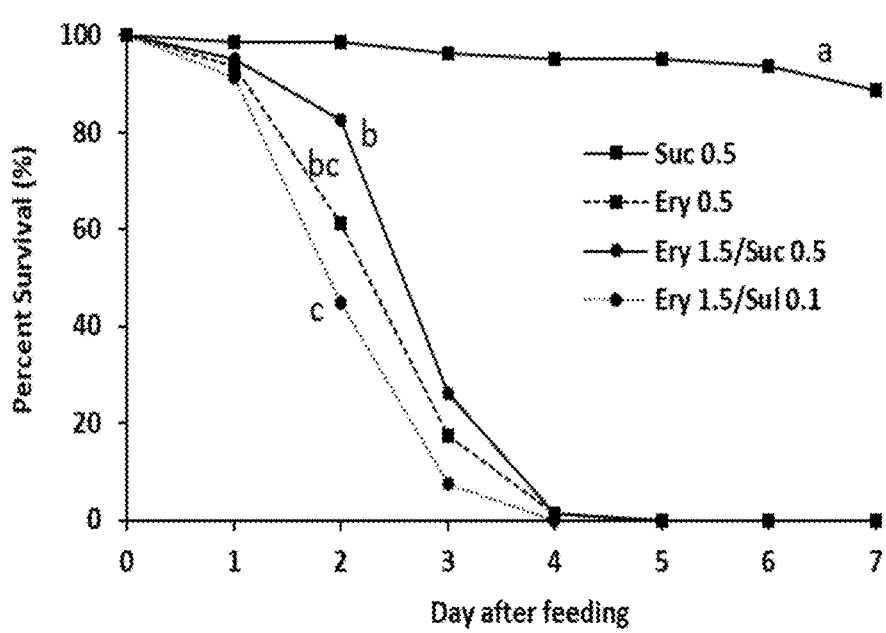
FIG. 2 shows and survivorship of *D. suzukii* adults with combinations of erythritol/sucrose or sucralose solutions as described below. Each combination was replicated eight times.
Figure 6:
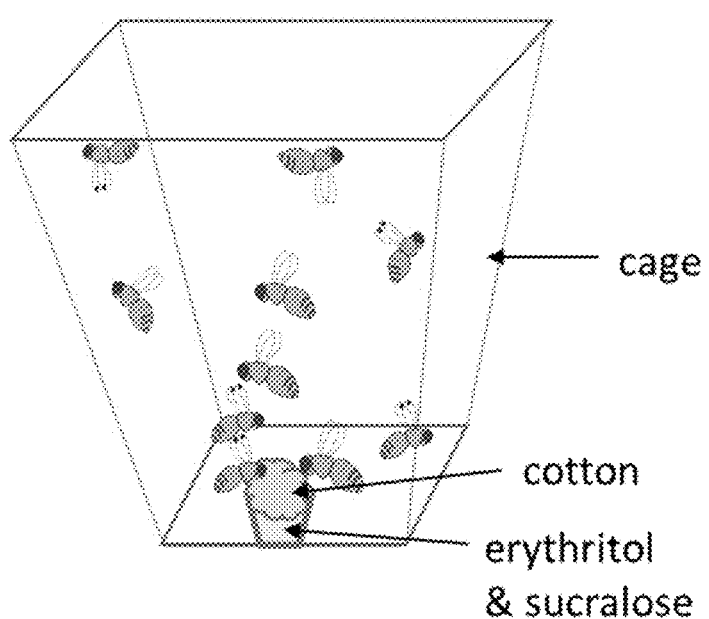
FIG. 6 shows survivorship arena of *D. suzukii* in a plastic cage with combinations of erythritol/sucrose or sucralose solutions as described below.
Figure 7:
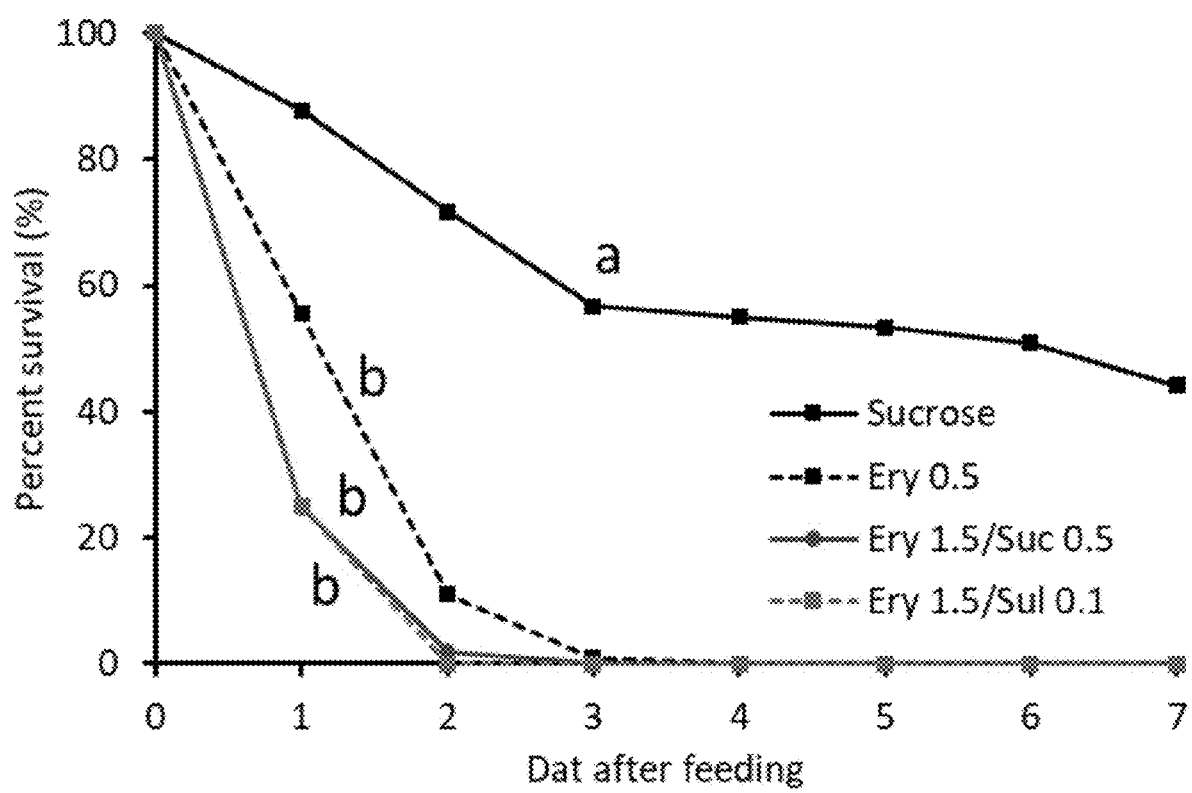
FIG. 7 shows survivorship of *D. suzukii* adults with combinations of erythritol/sucrose or sucralose solutions as described below. Each combination was replicated eight times.

Effect of erythritol formulations with sucrose or sucralose on fly mortality in the cage experiment: Two combinations of erythritol (Ery) mixed with sucrose (Suc) or sucralose (Sul) were introduced to ten flies in a cage (25 cm wide×25 cm deep×28 cm height) for 7 days (FIG. 6). Surprisingly the fastest and highest mortality occurred with erythritol 1.5 M/sucralose 0.1 M (Ery 1.5/Sul 0.1) (FIG. 7). The results from the erythritol 1.5M/sucrose 0.5 M (Ery 1.5/Suc 0.5) and erythritol 0.5M were statistically similar. The cage experiment shared similar results with both the vial and cup experiments (FIG. 2, FIG. 5, FIG. 7). In summary, the erythritol/sucralose formulation will not affect human health. The erythritol/sucralose formulation can be directly applied as an insecticide for insects such as *Drosophila suzukii*. A low sucralose concentration (e.g., about 0.1 M) can be directly applied as an insecticide. The formulations can be used as a phagostimulant with conventional or biological insecticides. The formulations combined with conventional insecticides can reduce the amount of chemical dose sprayed in the field. This invention can be applied to other Dipteran pests including mosquitoes.

All of the references cited herein, including U.S. Patents and U.S. Patent Application Publications, are incorporated by reference in their entirety. Also incorporated by reference in their entirety are the following references: Baudier, K. M., et al., PLoS ONE 9: e98949 (2014); Burke, C. J., et al., Current Biology, 21:746-750 (2011); Choi, M. Y., et al., Journal of Insect Physiology, 99: 86-94 (2017); Choi, M. Y., et al., Journal of Economic Entomology, 112: 981-985 (2019); Fisher, M. L., et al., Journal of Medical Entomology, 54: 999-1005 (2017); Fujita, M., et al., Current Biology, 21: 751-755 (2011); O'Donnell, S., et al., Journal of Insect Science, 16:1-3 (2016); Sampson, B. J., et al., Journal of Applied Entomology, 141: 8-18 (2017); Sampson, B. J., et al., Journal of Economic Entomology 110: 530-534 (2017); Sampson, B. J., et al., Journal of Econ Entomology, 112: 173-180 (2019); Tang, S. B., et al., Journal of Insect Physiology, 101: 178-184 (2017); Woltz, J. M., et al., Journal of Applied Entomology, 139: 759-770 (2015); Zheng, C., et al., Pest Managment Science, 72: 990-996 (2016).

Thus, in view of the above, there is described (in part) the following:

An insecticidal composition, wherein said composition comprises (or consists essentially of or consists of) an insecticidal effective amount of erythritol and sucralose, and optionally a carrier. The above insecticidal composition, wherein said composition comprises an insecticidal effective ratio of erythritol and sucralose. The above insecticidal composition, wherein said insecticidal effective ratio of erythritol and sucralose is about 200 to about 20. The above insecticidal composition, wherein said insecticidal effective ratio of erythritol and sucralose is about 100 to about 10. The above insecticidal composition, wherein said insecticidal effective ratio of erythritol and sucralose is about 10 to about 1. The above insecticidal composition, wherein said insecticidal effective ratio of erythritol and sucralose is about 1 to about 0.1. The above insecticidal composition, wherein said carrier is water.

An insecticidal bait composition, said composition comprising (or consisting essentially of or consisting of)
(a) an effective amount of the above insecticidal composition,
(b) one or more food materials (e.g., protein, yeast, etc.),
(c) optionally a phagostimulant (e.g., sucrose, etc.), and
(d) optionally an attractant (e.g., wine, vinegar, etc.)

A method for killing insects, said method comprising (or consisting essentially of or consisting of) treating an object or area with a composition comprising (or consisting essentially of or consisting of) an insects killing effective amount of the above insecticidal composition. The above method, wherein said insects are a member of the Order Diptera. The above method, wherein said insects are a member of the Drosophilidae family or the Tephritidae family.

The above method, wherein said insects are *Drosophila suzukii*. The above method, wherein said insects are a member of the Culicidae family.

The combination of erythritol and sucralose may be the sole insecticide. The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): " . . . Written support for a negative limitation may also be argued through the absence of the excluded element in the specification, known as disclosure by silence . . . Silence in the specification may be used to establish written description support for a negative limitation. As an example, in *Ex parte Lin* [No. 2009-0486, at 2, 6 (B.P.A.I. May 7, 2009)] the negative limitation was added by amendment . . . In other words, the inventor argued an example that passively complied with the requirements of the negative limitation . . . was sufficient to provide support . . . This case shows that written description support for a negative limitation can be found by one or more disclosures of an embodiment that obeys what is required by the negative limitation . . . ."

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Mortality (%) of flies when fed different sugar formulations for 7 days.

|  | Sucrose (Suc) 0.5M | Erythritol (Ery) 0.5M | Ery 1.5M/ Suc 0.5M | Ery 1.5M/ Sul 0.1M |
|---|---|---|---|---|
| Day1 | 1.3 | 6.3 | 5.0 | 8.8 |
| Day2 | 1.3 | 38.8 | 17.5 | 55.0 |
| Day3 | 3.8 | 82.5 | 73.8 | 92.5 |
| Day4 | 5.0 | 98.8 | 98.8 | 100.0 |
| Day5 | 5.0 | 100 | 100.0 | 100.0 |
| Day6 | 6.3 | 100.0 | 100.0 | 100.0 |
| Day7 | 11.3 | 100.0 | 100.0 | 100.0 |

TABLE 2

Mortality (%) of flies when fed different erythritol and sucralose formulations for 7 days.

|  | Sucrose (Suc) 0.5M | Erythritol (Ery) 0.5M | Sucralose (Sul) 0.5M | Sul 0.1M | Ery 1.5M/Sul 0.5M | Ery 1.5M/Sul 0.1M* | Ery 2M/Sul 0.5M* | Ery 2M/Sul 0.1M* | Ery 2M/Sul 0.01M |
|---|---|---|---|---|---|---|---|---|---|
| Day 1 | 0.0 | 0.0 | 0.0 | 0.0 | 0.0 | 0.0 | 0.0 | 0.0 | 0.0 |
| Day 2 | 2.5 | 0.0 | 0.0 | 0.0 | 1.3 | 2.5 | 1.3 | 1.3 | 0.0 |
| Day 3 | 2.5 | 13.8 | 23.8 | 37.5 | 5.0 | 58.8 | 47.5 | 62.5 | 28.8 |
| Day 4 | 2.5 | 46.3 | 62.5 | 65.0 | 66.3 | 100.0 | 90.0 | 98.8 | 91.3 |
| Day 5 | 5.0 | 81.3 | 96.3 | 92.5 | 97.5 | 100.0 | 100.0 | 100.0 | 100.0 |
| Day 6 | 5.0 | 98.8 | 100.0 | 100.0 | 100.0 | 100.0 | 100.0 | 100.0 | 100.0 |
| Day 7 | 6.3 | 100.0 | 100.0 | 100.0 | 100.0 | 100.0 | 100.0 | 100.0 | 100.0 |

Asterisk (*) denotes not significant difference by log-rank pairwise comparisons.

We claim:

1. A method for killing insects, of the family Drosophilidae, said method comprising treating an object or area with a composition comprising an insects killing effective amount of erythritol, sucralose and optionally a carrier, wherein the ratio of erythritol to sucralose is from about 1 to about 0.01 to about 10 to about 1.

2. The method of claim 1, wherein said insects are *Drosophila suzukii*.

3. The method of claim 1, wherein ratio of erythritol to sucralose is about 1 to about 0.01.

4. The method of claim 1, wherein ratio of erythritol to sucralose is about 10 to about 1.

5. The method of claim 1, wherein the composition is an insecticidal bait composition, further comprising one or more food materials, optionally a phagostimulant and optionally an attractant.

\* \* \* \* \*